Patented Apr. 19, 1938

2,114,326

UNITED STATES PATENT OFFICE 2,114,326

AMINOPHENYL-OXAZOLINES

Roger Adams and Marlin Templeton Leffler, Urbana, Ill., assignors to Abbott Laboratories, North Chicago, Ill., a corporation of Illinois No Drawing. Application July 15, 1935, Serial No. 31,454

6 Claims. (Cl. 260—44)

Phenyl and various substituted phenyl-2-oxazolines are well-known compounds, but so far as we are aware no aminophenyl derivatives of such compounds have ever previously been prepared.

We have produced aminophenyl-2-oxazolines and substitution products thereof and have discovered that such compounds have value as local anesthetics. We have found that the compounds referred to possess local anesthetic activity either by injection or by surface application to mucous membranes. These compounds are of special value inasmuch as their toxicity is low in comparison with local anesthetics which have been commonly employed. The ratio of anesthetic efficiency to toxicity in our new compounds above referred to is a very favorable one, and said compounds are non-irritating in solution. Certain of the substitution products described have the unusual property of giving monohydrochlorides which show a basic reaction.

The compounds to be described may be assigned the general formula:

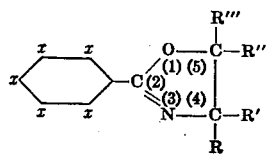

where one $x$ is an amino group and the other $x$'s are hydrogen or a univalent substituent, such as halogen, methoxyl, etc., and where R, R', R'', and R''' are each hydrogen, an alkyl, a substituted alkyl, or an aryl group, or where R' and R'' may form together an alicyclic group.

The aminophenyl-2-oxazolines are somewhat soluble in water. The solubility varies with the position and nature of substituents present; thus, m-amino-phenyl-2-oxazoline is soluble in water to the extent of about one per cent at 30°, and the p-amino-m,m-dibromophenyl-2-oxazoline is only very slightly soluble.

The aminophenyl-2-oxazolines, in general, form monobasic salts with strong or weak acids, and the salts, especially those with strong acids, are much more soluble in water than the corresponding bases. Thus, the monohydrochloride of p-aminophenyl-2-oxazoline is soluble in water at room temperature to over 10 per cent. The p-amino-m,m-dibromophenyl-2-oxazoline, on the other hand, forms salts which hydrolyze in water due to decreased basicity of the molecule because of the two bromine atoms present.

Salts of the various bases with hydrochloric acid, hydrobromic acid, sulfuric acid, phosphoric acid, etc., show analogous relationships. With weak acids, generally an excess of acid is necessary to increase the solubility substantially over that of the base. Acids, such as boric, acetic, acetamide, etc., may be used. The salts in general show an acid reaction.

The (diethyl and dibutylaminomethyl) 5-(p)-aminophenyl-2-oxazoline forms a mono-hydrochloride which is very soluble in water and shows an alkaline reaction.

The aminophenyl-2-oxazolines are hydrolyzed by boiling with excess of mineral acid to give the hydrochlorides of β-aminoethyl aminobenzoates which with cold alkali are converted to β-hydroxyethyl amino-benzamides.

The solutions of the bases or salts in water have a local anesthetic action but the solutions of the salts are more satisfactory since higher concentrations can be obtained. Some of the solid salts are well-crystallized, easily handled compounds, and others are hygroscopic. As a consequence, some of the salt solutions are most conveniently made by direct titration of the base with an acid without isolation of the salts. In general, excess of mineral acid over the monobasic salt should be avoided as the oxazolines are much more susceptible to hydrolysis under these conditions. Excess of weak acids is permissible.

The aminophenyl-2-oxazolines are prepared by reduction of the corresponding nitro compounds by any of the methods commonly used. The nitro compounds are in general, readily formed (1) by condensing the proper nitro or substituted nitro aromatic acid chloride with the salt of an amino alkyl halide (produced from amino ethanol or a substituted amino ethanol with a halogen acid or phosphorus halide). The intermediate halogenated amides, thus produced, on treatment with alkali give oxazolines. A second alternative method (2) is to condense the acid chloride with an amino ethanol, and to treat the resulting hydroxy amide with sulfuric acid, thus causing the elimination of water to form an oxazoline. The third procedure (3) is to treat the hydroxy amide formed in (2) with thionyl chloride in order to replace the hydroxyl with chlorine, which intermediate depending on conditions either loses hydrogen chloride directly or by the action of alkali to give an oxazoline.

The m-aminostyryl-2-oxazoline is best prepared by reduction of the nitro compound with iron in neutral solution.

1. NO₂C₆H₄COCl+BrCH₂CH₂NH₂·HBr→NO₂C₆H₄CONHCH₂CH₂Br→NO₂C₆H₄C<sub>\\N—CH₂</sub><sup>/O—CH₂</sup> 

2. NO₂C₆H₄COCl+H₂NCH₂CH₂OH→NO₂C₆H₄C

3. NO₂C₆H₄CONHCH₂CHOHR→[NO₂C₆H₄CONHCH₂CHClR]→NO₂C₆H₄C

EXAMPLE 1
m-Aminophenyl-2-oxazoline

The corresponding nitro compound may be produced in two ways:

(1) The first method is a slight modification of that previously used by Elfeldt (Ber., 24, 3218 (1891)). To a solution of 20 g. of β-bromoethyl m-nitrobenzamide (prepared as described by Elfeldt or by direct nitration of β-bromoethyl benzamide) in 200 cc. of hot ethyl alcohol at 75° C., an ethyl alcohol solution of 3 g. of sodium hydroxide (aqueous alkali may be used) is added with rapid stirring. After an additional 30 seconds' stirring, the reaction mixture is poured into a large volume of cold water. The precipitate is filtered, dissolved in cold 10 per cent hydrochloric acid (below 20° to prevent hydrolysis), filtered again and the solution made alkaline with dilute aqueous ammonia. The crude m-nitrophenyl-2-oxazoline is recrystallized from 75 per cent ethyl alcohol or ethyl acetate as fine colorless needles, melting point 118–119°.

(2) The second method is by direct nitration of phenyl-2-oxazoline. To a solution of 3 g. of phenyl-2-oxazoline in 12 cc. of concentrated sulfuric acid, cooled to 0°, is added, with stirring, 4 cc. of a mixture of equal volumes of concentrated nitric and sulfuric acids. The temperature during nitration should be held between 5–15° C. At the end of twenty minutes, the reaction mixture is poured onto ice and dilute aqueous ammonia added till alkaline. The precipitate is filtered and recrystallized from 75 per cent ethyl alcohol, melting point 118–119°.

The amino compound may be made from the nitro compound by any of the common methods of reduction. For example:

(1) A mixture of 17 g. of m-nitrophenyl-2-oxazoline and about 60 g. of clean, fine iron turnings is well stirred and enough water added to give a thin paste. A few drops of concentrated hydrochloric acid are added and the mixture stirred for about 20 minutes. After this initial treatment, a few drops of hydrochloric acid, a few grams of iron and, if necessary, a little water are added, from time to time, and the mixture warmed on a steam bath and stirred. About two hours is required to make certain of complete reduction. At the end of this digestion, the greater part of the water is allowed to evaporate and the iron then extracted four times with 175 cc. portions of benzene. By vacuum evaporation of the benzene, a crude yellow solid is obtained, purified by crystallization from hot water or a mixture of benzene and low-boiling petroleum ether. The m-aminophenyl-2-oxazoline forms colorless flat needles from water, melting point 125–6° (corrected).

(2) A solution of 12 g. of m-nitrophenyl-2-oxazoline in 150 cc. of warm ethyl alcohol containing a few drops of glacial acetic acid is reduced under 2 to 3 atmospheres pressure with 0.3 g. of platinum oxide catalyst and hydrogen. After the necessary hydrogen is absorbed, the catalyst is filtered and the alcohol evaporated. The crude product is a little more difficult to purify than that obtained by the iron reduction; melting point 125–126° (corrected).

EXAMPLE 2
β-Bromoethyl p-nitrobenzamide

A solution of 40 g. of p-nitrobenzoyl chloride in 50 cc. of benzene is added to a solution of 44 g. of β-bromoethylamine hydrobromide in 200 cc. of water. To this mixture, with vigorous stirring or shaking, a cold 5 per cent solution of 17.8 g. of sodium hydroxide is added in portions, and the reaction mixture kept below 50° C. The crude amide separates soon after the addition of the alkali. The reaction mixture should be alkaline to litmus and should be stirred for two hours to insure removal of any unreacted nitrobenzoyl chloride. The product is recrystallized from benzene, forming fine colorless needles, melting point 121–122°.

This product, by the method described for the meta nitro compound, is converted into p-nitrophenyl-2-oxazoline which, in turn, may be reduced by the methods already described to the corresponding amino compound.

EXAMPLE 3
p-Amino-m,m-dibromophenyl-2-oxazoline

Into a solution of 2.5 g. of p-aminophenyl-2-oxazoline in 30 cc. of 10 per cent aqueous hydrochloric acid is drawn a slow stream of bromine-laden air till the solution takes on a pink tint. The precipitate that forms is filtered and recrystallized from 50 per cent methyl alcohol. It forms short colorless needles, melting point 193–194° (with decomposition).

The structure of this molecule may be proved by suspending in a little alcohol and 30 per cent hydrochloric acid and refluxing till hydrolyzed. The product obtained is 4-amino-3,5-dibromobenzoic acid, melting point 330° (with decomposition), after recrystallization from nitrobenzene.

EXAMPLE 4
Dimethyl-5,5-(m)-nitrophenyl-2-oxazoline

The β-hydroxy-β-methyl-n-propyl-m-nitrobenzamide may be prepared as follows:

A solution of 25 g. of m-nitrobenzoyl chloride in 30 cc. of benzene is added to a solution of 12.6 g. of β-methyl-β-hydroxypropyl amine in 100 cc. of water. To this emulsion, with vigorous stirring or shaking, is added in portions a cold 5 per cent solution of 5.6 g. of sodium hydroxide. The temperature is maintained below 50°. The reaction mixture is shaken for two hours to insure the complete removal of any unreacted nitrobenzoyl chloride. The crude β-methyl-β-hydroxypropyl-m-nitrobenzamide is recrystallized from ethyl acetate, forming colorless plates, melting point 129–129.5° (corrected).

The nitro oxazoline is formed from the hydroxy amide by ring closure with sulfuric acid.

To 35 g. of β-methyl-β-hydroxypropyl-m-nitrobenzamide is added with stirring 100 cc. of concentrated sulfuric acid (sp. g. 1.84). The reaction mixture is warmed slowly to 55°, at which temperature all of the amide should be in solution. Stirring is continued for an additional ten minutes, at the end of which time the reaction mixture is cooled to 15°, poured into 600 g. of ice-water, filtered from any insoluble material, and the clear, cold filtrate made ammoniacal with 10 per cent aqueous ammonia. The precipitated dimethyl-5,5-(m)-nitrophenyl-2-oxazoline is recrystallized from 70 per cent alcohol, forming colorless needles, melting point 81–82° (corrected).

This compound may be reduced by any of the methods already described to the corresponding amino compound.

EXAMPLE 5

(Dibutylaminomethyl)-5-(p)-nitro-phenyl-2-oxazoline

The γ-dibutylamino-β-hydroxy-n-propyl-p-nitrobenzamide may be produced in the following manner:

A 250 cc. pressure bottle containing 10.0 g. of γ-chloro-β-hydroxy-n-propyl-p-nitrobenzamide (prepared by the method outlined for β-methyl-β-hydroxypropyl-m-nitrobenzamide) and 10.0 g. (two moles) of dibutylamine is heated on the steam-cone for ten to twelve hours, the bottle being shaken at frequent intervals. When the reaction is complete, the cooled pressure bottle is opened, and to the mush of amine hydrochloride and free base is added enough cold 10 per cent hydrochloric acid to make the mixture strongly acidic. Any unreacted amide is removed by extracting the acid solution with two 50 cc. portions of ether. The water layer is then cooled to 10°, made alkaline with strong sodium hydroxide, and extracted three times with a mixture of equal portions of benzene and ether. After drying the ether-benzene extract over solid potassium hydroxide, the solvents and excess of dibutylamine are removed by warming under reduced pressure. The residue is dissolved in a small quantity of benzene, and poured into an excess of cold ether. The crude γ-(dibutylaminomethyl)-β-hydroxy-n-propyl-m-nitrobenzamide is recrystallized from a mixture of benzene and high petroleum ether, forming yellow spurs, melting point 83.5–84.5° (corrected).

This product is converted into (dibutylaminomethyl)-5-(p)-nitrophenyl-2-oxazoline by treatment with thionyl chloride.

To 3.5 g. of γ-(dibutylaminomethyl)-β-hydroxy-n-propyl-p-nitrobenzamide is added an excess of 33.4 g. (20 cc.) of redistilled thionyl chloride. The amide goes into solution at once with the evolution of heat. The flask containing the reaction mixture is attached to a reflux condenser provided with an efficient gas-trap and the reaction mixture refluxed on a water bath for one and one-half to two hours. After the solution has been cooled to 5°, it is poured into 175 cc. of dry ether, and allowed to stand at 5° overnight. The crystals of dihydrochloride which separate, are filtered, washed with dry ether to remove the excess thionyl chloride, and dissolved in 100 cc. of cold water. To the water solution, cooled in an ice-salt bath to below 5°, is added slowly with stirring, a cold concentrated solution of sodium hydroxide, the temperature being held below 5° during the neutralization. The crude free base usually comes down as an oil which, however, soon solidifies and is filtered with suction. The crude (dibutylaminomethyl)-5-(p)-nitrophenyl-2-oxazoline is recrystallized from 80 per cent alcohol, forming colorless flakes, melting point 60.5–61° (corrected).

This compound may be reduced, by any of the methods previously described, to the corresponding amino compound.

*Additional aminophenyl oxazolines*

The derivatives listed below are prepared by condensation of the proper acid chloride and the proper amino alkyl halide or amino alcohol to give, respectively, the halogenated alkyl nitrobenzamide or hydroxyalkyl nitrobenzamide. The formation of the nitrophenyl or substituted nitrophenyl oxazolines from (1) the halogenated alkyl benzamides is accomplished by the method described under the preparation of m-nitrophenyl oxazoline, and from (2) the hydroxy alkyl nitrobenzamides is accomplished by (a) the method described under the preparation of dimethyl-5,5-(m)-nitrophenyl-2-oxazoline, or by (b) the method described under the preparation of (dibutylaminomethyl)-5-(p)-nitrophenyl-2-oxazoline. The corresponding amino derivatives are produced by one of the methods of reduction described for m-aminophenyl oxazoline.

The m-nitrostyryl-2-oxazoline is prepared by condensation of m-nitrocinnamoyl chloride and β-bromoethyl amine to form β-bromoethyl-m-nitrocinnamamide, which on treatment with alkali in the usual manner yields the nitro oxazoline. This compound is best reduced to the amino derivative by the iron-water reduction described under the preparation of m-aminophenyl-2-oxazoline.

A list of products made by us and their constants is given below:

| Compound | M. P. °C. (corrected) | Form | Crystallized from |
|---|---|---|---|
| o-Aminophenyl-2-oxazoline. | 55–56 | Colorless needles | Petroleum ether. |
| m-Aminophenyl-2-oxazoline. | 125–126 | Colorless needles | Ethyl acetate. |
| p-Aminophenyl-2-oxazoline. | 160–161 | Colorless needles | Benzene. |
| m-Amino-p-methoxyphenyl-2-oxazoline. | 126.5–127.5 | Colorless needles | Ethyl acetate. |
| p-Amino-m,m-dibromophenyl-2-oxazoline. | 193–194 | Colorless needles | Dilute methanol. |
| Methyl-5-(o)-aminophenyl-2-oxazoline. | 41.5–42 | Colorless plates | Petroleum ether. |
| Methyl-5-(m)-aminophenyl-2-oxazoline. | 115–116 | Colorless needles | Benzene and petroleum ether, 3:1. |
| Methyl-5-(p)-aminophenyl-2-oxazoline. | 128.5–129.5 | Colorless needles | Benzene. |
| Dimethyl-5,5-(m)-aminophenyl-2-oxazoline. | 122–123 | Colorless prisms | Ethyl acetate. |
| Dimethyl-5,5-(p)-aminophenyl-2-oxazoline. | 145–146 | Colorless needles | Ethyl acetate. |

| Compound | M. P. °C. (corrected) | Form | Crystallized from |
|---|---|---|---|
| Dimethyl - 4,5 - (p) - aminophenyl - 2 - oxazoline. | 211–212 | Colorless needles | Ethyl acetate. |
| Cyclohexano - 4,5 - (p) - aminophenyl - 2 - oxazoline. | 155–156 | Colorless prisms. | Ethyl acetate. |
| (n) Butyl - 4 - (p) - aminophenyl - 2 - oxazoline - (monohydrochloride). | 197–197.5 | Colorless flakes. | Absolute alcohol. |
| Phenyl - 4 - (p) - aminophenyl-2-oxazoline. | 150–150.5 | Colorless prisms. | Ethyl acetate. |
| (Diethylaminomethyl) - 5 - (p) - aminophenyl - 2 - oxazoline - (monohydrochloride). | 190–191 | Colorless spurs. | Absolute alcohol. |
| (Dibutylaminomethyl)-5-(p)-aminophenyl-2-oxazoline (monohydrochloride). | 204–205 | Colorless prisms | Absolute alcohol. |
| m-Aminostyryl-2-oxazoline. | 144–145 | Yellow needles. | Ethyl acetate. |

As certain of the amides, which are intermediates in the preparation of the oxazolines derivatives, are new compounds, the constants are given below:

| Compound | M. P. °C. (corrected) | Form | Crystallized from |
|---|---|---|---|
| β-Bromoethyl-o-nitrobenzamide. | 122.5–123.5 | Colorless needles. | Benzene. |
| β-Bromoethyl-p-nitrobenzamide. | 121–122 | Colorless needles. | Benzene. |
| β-Hydroxy-β-methyl-n-propyl-m-nitrobenzamide. | 129–129.5 | Colorless plates. | Ethyl acetate. |
| β-Hydroxy-β-methyl-n-propyl-p-nitrobenzamide. | 134.5–135.5 | Colorless needles. | Ethyl acetate. |
| β-Chloro-α-phenylethyl-p-nitrobenzamide. | 132.5–133.5 | Greenish needles. | Benzene. |
| β-Chloro-α-(n)butyl-ethyl-p-nitro-benzamide. | 116.5–118 | Colorless flakes. | Dilute ethanol. |
| β-Bromoethyl-m-nitro-p-methoxybenzamide. | 110–111 | Colorless needles. | Benzene. |
| β-Bromoethyl-m-nitrocinnamamide. | 107–108 | Colorless needles. | Benzene. |
| γ-Diethylamino-β-hydroxypropyl-p-nitrobenzamide (hydrochloride). | 163–164.5 | Colorless spurs. | Absolute alcohol. |
| γ-Dibutylamino-β-hydroxypropyl-p-nitrobenzamide. | 83.5–84.5 | Yellow spurs. | Benzene and petroleum ether. |
| Hydroxy-2-cyclohexyl-p-nitro-benzamide. | 210.5–211.5 | Colorless needles. | Ethanol. |

The constants of the intermediate nitro oxazolines which are new compounds are listed below:

| Compound | M. P. °C. (corrected) | Form | Crystallized from |
|---|---|---|---|
| o-Nitropheny-2-oxazoline. | 52–53 | Colorless needles | 50% ethanol. |
| p-Nitrophenyl-2-oxazoline | 178–178.5 | Colorless needles | Alcohol. |
| m-Nitro-p-methoxy-phenyl-2-oxazoline. | 122–123 | Colorless needles. | Dilute ethanol. |
| Dimethyl-5,5-(m)-Nitrophenyl-2-oxazoline. | 81–82 | Colorless needles. | Dilute ethanol. |
| Dimethyl-5,5-(p)-Nitrophenyl-2-oxazoline. | 143–144 | Greenish needles. | Dilute ethanol. |
| Dimethyl-4,5-(p)-Nitrophenyl-2-oxazoline. | 122.5–123.5 | Colorless needles. | Dilute ethanol. |
| Cyclohexano-4,5-(p)-nitrophenyl-2-oxazoline. | 129.5–130.5 | Colorless needles. | Absolute alcohol. |
| (n)Butyl-4-(p)-nitrophenyl-2-oxazoline. | 46–47 | Light yellow needles. | Alcohol. |
| Phenyl-4-(p)-Nitrophenyl-2-oxazoline. | 108.5–109 | Fine yellow needles. | Alcohol. |
| (Diethylaminomethyl)-5-(p)-nitrophenyl-2-oxazoline. | 57–57.5 | Yellow needles. | Dilute ethanol. |
| (Dibutylaminomethyl)-5-(p)nitrophenyl-2-oxazoline. | 60.5–61 | Colorless flakes | Dilute ethanol. |
| m-Nitrostyryl-2-oxazoline. | 117–118 | Colorless needles. | Dilute ethanol. |

*Mono-hydrochlorides*

A solution of 5 g. of p-aminophenyl-2-oxazoline in dry ether or dry ethyl acetate is treated with dry hydrogen chloride until precipitation is complete. The product is filtered and purified several times by crystallization from absolute ethyl alcohol. Colorless needles; melting point 254–255 (with decomposition). Alkali regenerates the free base.

In a similar manner, methyl-5-p-aminophenyl-2-oxazoline forms a hydrochloride, colorless spurs; melting point 213–214° (with decomposition).

By a similar procedure, however, the m-aminophenyl-2-oxazoline forms a dihydrochloride which hydrolyzes upon attempts to purify. In general, the monohydrochlorides are best made by titration.

To a solution of 5.0 g. of diethylaminomethyl-5-(p)-aminophenyl-2-oxazoline in 300 cc. of dry ether is added 27.24 cc. of 0.7433 N absolute alcoholic hydrogen chloride. The mixture is allowed to stand at 5° over night, the hydrochloride filtered, and recrystallized from absolute alcohol, melting point 190–191°.

Dibutylaminomethyl-5-(p)-aminophenyl - 2 - oxazoline hydrochloride is formed in a similar manner, giving colorless prisms melting at 204–205°.

In like manner, (n) butyl-4-(p)aminophenyl-2-oxazoline forms a monohydrochloride, colorless flakes; melting point 197–197.5°.

Similarly, phenyl-4-(p)aminophenyl-2-oxazoline gives a monohydrochloride, colorless prisms; melting point 239–240° (with decomposition).

These compounds are anesthetics.

*Solutions of aminophenyl-2-oxazoline salts*

To a solution of 5.0 g. of m-aminophenyl-2-oxazoline in 100 cc. of methyl alcohol is added 90.72 cc. of 0.3508 N aqueous hydrochloric acid. The water and alcohol are removed under diminished pressure and the resulting solid salt made up to desired strength with water. Titration may also be carried out merely by suspending the base in aqueous solution.

Similarly, equivalent amounts of hydrobromic acid, sulfuric acid, etc., may be used to obtain the salts desired.

*m-Aminophenyl-2-oxazoline solution in acetamide*

To an aqueous 20 per cent acetamide solution, finely powdered, m-aminophenyl-2-oxazoline is added in amount necessary to make the desired strength, warmed till solution is complete, and filtered. The solution may be diluted in the water without precipitating the anesthetic. Other members of the series may similarly be dissolved in acetamide solution.

These solutions as well as the salts noted above are useful as anesthetics.

We claim as our invention:

1. As an anesthetic, methyl-5-(p)aminophenyl-2-oxazoline.

2. As an anesthetic, diethylaminomethyl-5-(p) aminophenyl-2-oxazoline monohydrochloride.

3. As an anesthetic, dibutylaminomethyl-5-(p) aminophenyl-2-oxazoline monohydrochloride.

4. A compound having the formula:

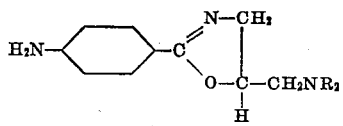

in which R is an alkyl group.

5. As an anesthetic, an aminophenyl-2-oxazoline.

6. As an anesthetic, a substituted aminophenyl-2-oxazoline having the general formula:

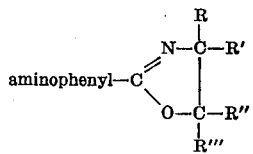

in which R, R', R'' and R''' are selected from the group consisting of hydrogen, alkyl and amino substituted alkyl groups, phenyl groups and radicals in which R' and R'' together form an alicyclic group.

ROGER ADAMS.
MARLIN TEMPLETON LEFFLER.